United States Patent [19]

Raj et al.

[11] Patent Number: 5,120,776

[45] Date of Patent: Jun. 9, 1992

[54] PROCESS FOR CHEMICAL TREATMENT OF DISCONTINUOUS CELLULOSIC FIBERS AND COMPOSITES OF POLYETHYLENE AND TREATED FIBERS

[76] Inventors: Govinda Raj, 3915 Louis-Pinard, App. 3, Trois-Rivières, Québec, Canada. G8Y 2G2; Bohuslav V. Kokta, 4045 de la Sapinière, Trois-Rivières, Québec, Canada, G8Y 1B2

[21] Appl. No.: 508,605

[22] Filed: Apr. 13, 1990

[30] Foreign Application Priority Data

Apr. 19, 1989 [CA] Canada ................... 597923

[51] Int. Cl.⁵ ................. C08L 89/00; C08G 63/00
[52] U.S. Cl. ....................... 524/13; 524/35; 524/36; 527/313; 527/314
[58] Field of Search ............. 524/13, 35, 36; 527/313, 314

[56] References Cited

U.S. PATENT DOCUMENTS

| | | | |
|---|---|---|---|
| 3,645,939 | 2/1972 | Gaylord | 525/193 |
| 3,697,364 | 10/1972 | Boustany et al. | 524/35 |
| 3,764,456 | 10/1973 | Woodhams | 524/789 |
| 3,943,079 | 3/1976 | Hamed | 524/34 |
| 4,107,110 | 8/1978 | Lachowicz et al. | 524/452 |
| 4,323,625 | 4/1982 | Coran et al. | 428/361 |
| 4,376,144 | 3/1983 | Goettler | 428/36 |
| 4,409,345 | 10/1983 | Moteki et al. | 524/13 |
| 4,442,243 | 4/1984 | Woodhams | 524/487 |
| 5,075,359 | 12/1991 | Castagna et al. | 524/13 |

FOREIGN PATENT DOCUMENTS 7634301 11/1976 France .

*Primary Examiner*—Nathan M. Nutter
*Attorney, Agent, or Firm*—Paul Marcoux

[57] ABSTRACT

Cellulosic fibers were pre-treated with maleic anhydride or phthalic anhydride in the presence of an intitiator to improve the bonding and dispersibility of the fibers in the polymer matrix. High density polyethylene (HDPE) was filled with chemically treated chemithermomechanical pulp (CTMP) and wood flour. Composites of HDPE-pre-treated wood fibers, characterized at different fiber ratios, produced superior mechanical properties than the untreated fiber composites. These composites can be compression or injection molded to produce useful articles.

9 Claims, No Drawings

PROCESS FOR CHEMICAL TREATMENT OF DISCONTINUOUS CELLULOSIC FIBERS AND COMPOSITES OF POLYETHYLENE AND TREATED FIBERS

FIELD OF THE INVENTION

This invention relates to the process of chemical treatment of cellulosic fibers to improve the bonding with the polymer matrix, and thereby in improving the mechanical properties of thermoplastic-wood fiber composites.

BACKGROUND OF INVENTION

It is well known that incorporation of discontinuous fibers with polymeric materials can impart improved properties such as greater strength and stiffness to the polymer matrix. Such materials are described, for example, in U.S. Pat. No. 3,764,456 to Woodhams and in U.S. Pat. No. 4,442,243 which describes reinforced mica-thermoplastic composites having improved physical properties and durability. The combination of discontinuous cellulosic fibers with a variety of vulcanized elastomers is described in U.S. Pat. No. 3,697,364 to Boustany and Coran.

The use of inorganic fillers such as mica and glass fiber possess many difficulties during the fabrication. Due to its abrasive nature these fillers cause more wear to the processing machinery and also since these fillers are brittle they suffer extensive breakage during compounding. Many of the above mentioned problems can be greatly reduced when organic fillers were used. The great abundance and cheapness of cellulosic materials make them one of the attractive choice as a low cost fillers in polymers. The published literature contains number of references for the use of cellulosic fillers as additives for both thermosets and thermoplastic polymers.

Although the use of cellulosic fillers in thermoset resins has been known for decades, their use in thermoplastics has been limited as a result of problems in dispersing the filler in thermoplastic matrix and the lack of chemical bonding between the filler and polymer matrix. It has been shown by Hamed in U.S. Pat. No. 3,943,079 that the dispersion of discontinuous cellulosic fibers in the polymer matrix can be greatly improved by pretreatment of the fibers with a polymer and a lubricant. The French Patent No. 76,34301 describes the preparation of a new material, property of which can be adjusted to adaptation of different applications, which can be formed by a copolymer or a by grafting in a manner that can play a reinforcement role to the polymer.

Goettler in U.S. Pat. No. 4,376,144 has shown that the adhesion of discontinuous cellulose fibers to a matrix of vinyl chloride polymer can be substantially improved by incorporating therewith a bonding agent which is a cyclic trimer of toluene diisocyanate. The bonding agent also improved the dispersibility of the treated fibers into the matrix material. The bonding agent has been found effective at relatively low concentrations-as low as 0.1 parts by weight on 100 parts by weight of the vinyl chloride polymer in the matrix. Coran and Patel have found that U.S. Pat. No. 4,323,625, treated fibers comprising discontinuous cellulosic fibers of aspect ratio greater than five, and methylol phenolicmodified crystalline polymer from alpha olefin monomer having 2–4 carbon atoms, said modified crystalline polymer being present in an amount sufficient to reduce fiber-to-fiber interactions up to about 85 parts by weight per 100 parts of fibers by weight, have useful properties. Advantageously, the fibers can be oriented to a greater or less degree, providing products having a greater strength and stiffness in the direction of orientation.

Gaylord described in U.S. Pat. No. 3,645,939 a process for compatibilizing a material containing free hydroxy groups with a polymer which is otherwise incompatible, by bringing them together in the presence of an ethylenically unsaturated carboxylic acid, substituted carboxylic acid or carboxylic acid anhydride and a preradical precursor or preradical generating agent. Lochowicz et al., in U.S. Pat. No. 4,107,110 described that cellulose fibers, coated with a grafted copolymer comprising 1,2-polybutadiene to which is grafted an acrylate such as butylmethacrylate could be used in reinforcing of polyethylene and other plastic compositions.

SUMMARY OF THE INVENTION

According to the present invention, composites are made of chemically pre-treated discontinuous cellulosic fibers with a thermoplastic polymer has superior mechanical properties. More specifically, the thermoplastic composites consist of 90 to 50 weight percent of high density polyethylene (HDPE), the remaining 10 to 50 weight percent being the discontinuous cellulose fibers, pre-coated with a mixture of thermoplastic polymer 0 to 5 parts by weight of fiber, and a carboxylic acid anhydride 0 to 6 parts by weight of fiber and an activator 0 to 1 part by weight of fiber.

The term thermoplastic polymer includes polyethylene, polypropylene and their copolymers. The term cellulose fiber includes cellulose fiber derived from soft wood, hard wood pulps, e.g. chemical or mechanical or chemi-mechanical or high-yield or thermo-mechanical or refiner or stone groundwood or chemithermomechanical pulp or explosion pulp. The paper-mill waste pulp and recycled paper pulp can be used. Preferred are wood flour, chemithermomechanical pulp (CTMP). Hard wood fiber, because of its smaller diameter as compared with soft wood fiber is preferred. The fibers having an average fiber aspect ratio (average length to average diameter of the fibers) of 5 to 150 being preferred. Mixtures of fibers having different average aspect ratios can be usefully employed. The fibers can be pre-treated before incorporation into the polymer matrix to improve the bonding between the fiber and matrix and also to reduce the fiber-to-fiber interactions. Pre-treatment of the fibers is effective in reducing the time and work required to incorporate the fibers in the polymer matrix.

DESCRIPTION OF PREFERRED EMBODIMENTS

The composites of the invention comprise pre-treated discontinuous cellulose fibers mixed with the thermoplastic polymer. The pre-treatment of fibers can be carried out by coating with a bonding agent, an unsaturated carboxylic anhydride in the presence of an activator. Maleic anhydride or phthalic anhydride is the preferred bonding agent. Suitable activators are dicumyl peroxide, benzoyl peroxide and di-t-butyl peroxide. A polymer can be selected which is molten at the mixing temperatures employed and which acts to coat the fiber and to prevent fiber-to-fiber interactions, e.g. polyethylene.

The bonding agent of the invention includes those agents which have been found to be effective in enhancing adhesion with cellulosic materials, for example, an ethylenically unsaturated carboxylic acid, substituted carboxylic acid or carboxylic acid anhydride. Generally, an amount of 0.5 to 10 parts by weight in 100 parts by weight of the fiber is sufficient to optimize adhesion of the fiber to the matrix. The bonding process can be explained as follows: maleic anhydride, for example, reacts with OH groups of cellulose in the presence of an activator and a polymer, which acts as a binder, to form a cellulose maleate half ester. The half ester subsequently reacts with polyethylene in the presence of a free radical initiator such as dicumyl peroxide, the unreacted peroxide in the pre-treated fiber acts as a means for generating free radicals on the polymer, thus the polyethylene and cellulose are linked together by means of maleic anhydride forming a bridge between the normally uncompatible cellulose and polyethylene.

The pre-treating step can usually be performed by using conventional masticating equipment, for example, rubber mills, Brabender mixers, Banbury mixers, or twin screw continuous mixer extruder. The Brabender mixer is particularly effective for this purpose in the laboratory. The materials, fiber, bonding agent, activator, polyethylene can all be charged initially. The order of addition of materials to the mixer is not critical. The temperature of the mixing should be sufficiently high to melt the bonding agent and polyethylene to produce a homogeneous mixture with the fiber. Usually, about 160° C., is sufficient to obtain the treated fibers in the form of clusters lightly held together. The time of mixing will usually be minimized and will depend upon number of factors, such as the type of mixer, the proportions of the ingredients, and the size and temperature of the batch.

The proportions of the ingredients will ussually be dictated by the properties described in the treated fibers. Generally, the ratio of fibers to the other ingredients will be as high as possible in order to maximize production of the treated fibers. The amount of polymer used will be at least sufficient to prevent fiber-to-fiber interactions, usually at least 5 parts of polyethylene by weight per 100 parts by weight of cellulose fibers. The preferred level of bonding agent in the composite of invention is from 0.5 to 10 parts per 100 parts of cellulose fiber by weight. The amount of activator is usually 0 to 1 parts by weight of cellulose fiber. In most instances, it will be more convenient to include all of the bonding agent in the treated fibers, since no further additions of this ingredient need be added in making the final composite. Since the treatment step coats the surface of fibers to certain extent, the polymer present in the coating will be in a position to be bonded to the fibers. It appears also, that some additional bonding of the fiber to polyethylene is achieved during the composite formation.

The mixing of treated fibers and polymer to form a composite is usually performed in an internal mixer, or on a roll mill. Additional ingredients, such as fillers, colorants and stabilizers can be added at this point. This is followed by compression molding to produce a desired article. Injection molding techniques can also be used for the fabrication of different articles.

EXAMPLE 1

In order to compare the effects of various bonding agent on mechanical properties of the composites, a series of specimens were prepared containing the bonding agent of invention as well as other aromatic anhydride and control. Maleic anhydride (Aldrich) was used as the preferred bonding agent. Also included for comparison was a phthalic anhydride (Aldrich). The activator used was dicumyl peroxide.

TABLE 1

| Material | Percentage by weight |
| --- | --- |
| Chemithermomechanical pulp (CTMP) of aspen | 0 to 40 |
| Polyethylene | 100 to 60 |
| Maleic anhydride | 0 to 4 |
| Dicumyl peroxide | 0 to 1 |

Mixing was done in a Brabender roll mill at 165° C. In each case the sample was remixed a minimum of 5 times to produce a better dispersion of fiber in the polymer matrix. The above mixture was ground to mesh size 20 and compression molded at 160° C. (pressure 2.7 MPa) for 10 minutes. Dog bone shaped tensile specimens were obtained after cooling with the pressure maintained during the process.

Tensile tests were done using an Instron Model 4201 at 23° C. and 50% RH. The cross-head speed was 5 mm/min. Tensile modulus was measured at 0.1% elongation. Tensile properties were measured at peak load, break and at proof stress point (the point where the non-proportional strain deviates by a predetermined amount). The results were automatically calculated by HP86B computer using the Instron 2412005 General Tensile Test Program.

TABLE II

| Fiber (% wt.) | | Tensile strength (MPa) | | | | Elongation (%) | | | | Tensile modulus (GPa) | | | |
| --- | --- | --- | --- | --- | --- | --- | --- | --- | --- | --- | --- | --- | --- |
| | | 10 | 20 | 30 | 40 | 10 | 20 | 30 | 40 | 10 | 20 | 30 | 40 |
| HDPE | a | | 26.0 | | | | 9.9 | | | | 1.06 | | |
| | b | | 18.4 | | | | 3.1 | | | | — | | |
| HDPE + CTMP aspen | a | 26.5 | 24.7 | 24.1 | 21.3 | 6.1 | 4.8 | 3.2 | 2.0 | 1.31 | 1.42 | 1.58 | 1.8 |
| | b | 19.7 | 19.4 | 18.7 | 18.5 | 2.4 | 2.3 | 2.3 | 2.1 | — | — | — | — |
| HDPE + treated fiber1 | a | 29.7 | 30.1 | 35.6 | 32.1 | 8.7 | 8.4 | 6.8 | 5.6 | 1.27 | 1.37 | 1.53 | 1.7 |
| | b | 20.5 | 21.3 | 27.5 | 26.3 | 2.6 | 2.5 | 2.7 | 2.6 | — | — | — | — |
| HDPE + treated | a | 29.6 | 29.3 | 31.3 | 30.1 | 9.4 | 9.1 | 7.8 | 6.0 | 1.28 | 1.34 | 1.49 | 1.7 |
| | b | 20.3 | 20.7 | 22.2 | 23.1 | 2.6 | 2.5 | 2.6 | 2.6 | — | — | — | — |

TABLE II-continued

| Fiber | Tensile strength (MPa) | | | | Elongation (%) | | | | Tensile modulus (GPa) | | | |
|---|---|---|---|---|---|---|---|---|---|---|---|---|
| (% wt.) | 10 | 20 | 30 | 40 | 10 | 20 | 30 | 40 | 10 | 20 | 30 | 40 |
| fiber2 | | | | | | | | | | | | | a - Maximum load
b - Proof stress point
Treated fiber1: CTMP aspen (100 parts) + Maleic anhydride (2.0 parts) polyethylene (5.0 parts) + dicumyl peroxide (1.0 parts)
Treated fiber2: CTMP aspen (100 parts) + Maleic anhydride (4.0 parts) polyethylene (5.0 parts) + dicumyl peroxide (1.0 parts)

The results in Table II show an improvement in tensile properties when treated fibers were used in the composites. Tensile strength, at 30.0% filler level, increased from 24.1 MPa of untreated fiber composites to 35.6 MPa in the case of treated fiber1 composites. Higher elongation values were observed, with the increase in filler concentration, in treated fiber composites than untreated fiber composites. Tensile modulus increased steadily with the filler addition and was not much affected by fiber treatment.

EXAMPLE III

The composites were prepared and evaluated as in Example I, but in this case wood flour (aspen) was used instead of CTMP aspen pulp. The comparison of tensile properties with untreated fibers, presented in Table III, indicate that improved tensile properties result when treated fibers were used. Tensile strength increased steadily with the increase in filler concentration in treated fiber composites. At 40.0% filler level in treated fiber1 composites, tensile strength increased to 34.7 MPa compared to 19.6 MPa of untreated fiber composites. At proof stress point, higher tensile strength values were observed in treated fiber composites. The increase in maleic anhydride concentration in treated fibers do not appear to give further improvement.

TABLE III

| Fiber | | Tensile strength (MPa) | | | | Elongation (%) | | | | Tensile modulus (GPa) | | | |
|---|---|---|---|---|---|---|---|---|---|---|---|---|---|
| (% wt.) | | 10 | 20 | 30 | 40 | 10 | 20 | 30 | 40 | 10 | 20 | 30 | 40 |
| HDPE | a | | 26.0 | | | | 9.9 | | | | 1.06 | | |
|  | b | | 18.4 | | | | 3.1 | | | | — | | |
| HDPE + | a | 25.8 | 23.5 | 21.2 | 19.6 | 8.3 | 5.8 | 3.5 | 2.3 | 1.27 | 1.47 | 1.63 | 1.8 |
| sawdust | b | 18.5 | 19.2 | 19.6 | 19.4 | 2.4 | 2.3 | 2.2 | 2.1 | — | — | — | — |
| aspen | | | | | | | | | | | | | |
| HDPE + | a | 30.0 | 32.5 | 33.1 | 34.7 | 7.9 | 7.7 | 6.9 | 6.2 | 1.35 | 1.48 | 1.62 | 1.8 |
| treated | b | 22.9 | 23.8 | 24.4 | 26.6 | 2.7 | 2.7 | 2.6 | 2.5 | — | — | — | — |
| fiber1 | | | | | | | | | | | | | |
| HDPE + | a | 28.4 | 31.0 | 33.4 | 34.5 | 8.1 | 7.2 | 6.2 | 5.9 | 1.15 | 1.46 | 1.59 | 1.8 |
| treated | b | 22.2 | 23.3 | 24.6 | 25.5 | 3.0 | 2.8 | 2.6 | 2.6 | — | — | — | — |
| fiber2 | | | | | | | | | | | | | | a - Maximum load
b - Proof stress point
Treated fiber1: Wood flour (100 parts) + Maleic anhydride (2.0 parts) + polyethylene (5.0 parts) + dicumyl peroxide (1.0 parts)
Treated fiber2: Wood flour (100 parts) + Maleic anhydride (4.0 parts) + polyethylene (5.0 parts) + dicumyl peroxide (1.0 parts)

The treated fiber composites also produced better elongation values at higher filler addition when compared to untreated fiber composites. A sharp increase in modulus was observed with the addition of filler. The increase in modulus was not much affected by fiber treatment.

EXAMPLE IV

Using the process of Example I, composites are prepared as shown in Table IV. The samples had the following formulation:

TABLE IV

| Ingredients | Percentage by weight |
|---|---|
| Chemithermomechanical pulp (CTMP) of aspen | 0 to 40 |
| Polyethylene | 100 to 60 |
| Phthalic anhydride | 0 to 4 |
| Dicumyl peroxide | 0 to 1 |

Treated fibers were prepared as in Example I and the composites were made under the same experimental conditions as discussed in Example I. The results are given in Table V. The tensile test results indicate that treated fibers give very good adhesion. Even at a relatively low level of bonding agent (2.0 parts of phthalic anhydride per 100 parts of fiber) a significant increase in tensile strength was observed. The treated fibers also have better modulus values compared to unfilled HDPE.

TABLE V

| Fiber | | Tensile strength (MPa) | | | | Elongation (%) | | | | Tensile modulus (GPa) | | | |
|---|---|---|---|---|---|---|---|---|---|---|---|---|---|
| (% wt.) | | 10 | 20 | 30 | 40 | 10 | 20 | 30 | 40 | 10 | 20 | 30 | 40 |
| HDPE | a | | 26.0 | | | | 9.9 | | | | 1.06 | | |
|  | b | | 18.4 | | | | 3.1 | | | | — | | |
| HDPE + | a | 26.5 | 24.7 | 24.1 | 21.3 | 6.1 | 4.8 | 3.2 | 2.0 | 1.31 | 1.42 | 1.58 | 1.8 |
| CTMP | b | 19.7 | 19.4 | 18.7 | 18.5 | 2.4 | 2.3 | 2.3 | 2.1 | — | — | — | — |
| aspen | | | | | | | | | | | | | |
| HDPE + | a | 28.4 | 30.9 | 32.1 | 34.9 | 8.7 | 8.1 | 7.1 | 6.0 | 1.22 | 1.43 | 1.58 | 1.8 |

TABLE V-continued

| Fiber | | Tensile strength (MPa) | | | | Elongation (%) | | | | Tensile modulus (GPa) | | | |
|---|---|---|---|---|---|---|---|---|---|---|---|---|---|
| (% wt.) | | 10 | 20 | 30 | 40 | 10 | 20 | 30 | 40 | 10 | 20 | 30 | 40 |
| treated fiber3 | b | 19.9 | 20.9 | 23.4 | 26.2 | 2.8 | 2.5 | 2.5 | 2.4 | — | — | — | — |
| HDPE + treated fiber4 | a | 28.0 | 30.3 | 33.0 | 34.3 | 8.9 | 6.7 | 6.1 | 5.5 | 1.21 | 1.37 | 1.53 | 1.7 |
| | b | 19.8 | 22.9 | 24.8 | 26.0 | 2.8 | 2.7 | 2.6 | 2.7 | — | — | — | — | a - Maximum load
b - Proof stress point
Treated fiber3 CTMP aspen (100 parts) + Phthalic anhydride (2.0 parts) polyethylene (5.0 parts) + dicumyl peroxide (1.0 parts)
Treated fiber4 CTMP aspen (100 parts) + Phthalic anhydride (4.0 parts) polyethylene (5.0 parts) + dicumyl peroxide (1.0 parts)

EXAMPLE V

The composites were prepared and evaluated as in Example IV, but in this case wood flour (aspen) was used instead of CTMP aspen pulp. It is evident from the results of tensile properties (Table VI) that addition of treated fibers in polyethylene causes a significant improvement in bonding between the fiber and polymer matrix. The highest tensile strength is recorded with treated fiber3, where the strength increased from 19.6 MPa of untreated fiber composites to 37.2 MPa at 40.0% filler concentration in the composites. A significant improvement in strength was also observed at Proof stress point. Higher addition of bonding agent (4.0 parts of phthalic anhydride per 100 parts of wood fiber) do not produce much increase in tensile strength.

TABLE III

| Fiber | | Tensile strength (MPa) | | | | Elongation (%) | | | | Tensile modulus (GPa) | | | |
|---|---|---|---|---|---|---|---|---|---|---|---|---|---|
| (% wt.) | | 10 | 20 | 30 | 40 | 10 | 20 | 30 | 40 | 10 | 20 | 30 | 40 |
| HDPE | a | | 26.0 | | | | 9.9 | | | | 1.06 | | |
| | b | | 18.4 | | | | 3.1 | | | | — | | |
| HDPE + sawdust aspen | a | 25.8 | 23.5 | 21.2 | 19.6 | 8.3 | 5.8 | 3.5 | 2.3 | 1.27 | 1.47 | 1.63 | 1.8 |
| | b | 18.5 | 19.2 | 19.6 | 19.4 | 2.4 | 2.3 | 2.2 | 2.1 | — | — | — | — |
| HDPE + treated fiber3 | a | 29.4 | 30.0 | 32.2 | 37.2 | 8.5 | 6.7 | 5.9 | 5.6 | 1.22 | 1.40 | 1.65 | 1.8 |
| | b | 21.0 | 23.1 | 25.4 | 27.8 | 2.6 | 2.7 | 2.6 | 2.6 | — | — | — | — |
| HDPE + treated fiber4 | a | 28.2 | 30.4 | 32.7 | 34.9 | 8.7 | 7.5 | 7.1 | 6.2 | 1.16 | 1.36 | 1.59 | 1.8 |
| | b | 20.3 | 22.4 | 25.0 | 26.2 | 2.8 | 2.7 | 2.8 | 2.7 | — | — | — | — | a - Maximum load
b - Proof stress point
Treated fiber3: Wood flour (100 parts) + Phthalic anhydride (2.0 parts) + polyethylene (5.0 parts) + dicumyl peroxide (1.0 parts)
Treated fiber4: Wood flour (100 parts) + Phthalic anhydride (4.0 parts) + polyethylene (5.0 parts) + dicumyl peroxide (1.0 parts)

EXAMPLE VI

The Izod-impact test results in Table VII indicate that HDPE filled with treated fibers produce higher impact strength values, even at relatively low level of bonding agent (2.0 parts per 100 parts of cellulose fiber) compared to untreated fiber composites. Also the better impact strength of treated fiber2 and treated fiber3 composites than untreated fiber composites indicate good adhesion of bonded fibers with the polymer matrix.

TABLE VII

| Composite (Fiber wt. %) | Izod-Impact strength (KJ × $10^{-5}$) (un-notched) | | | |
|---|---|---|---|---|
| | 10 | 20 | 30 | 40 |
| HDPE 2907 + sawdust untreated | 26.9 | 24.9 | 23.8 | 22.2 |
| HDPE 2907 + treated fiber1 | 29.8 | 28.2 | 26.4 | 24.9 |

TABLE VII-continued

| Composite (Fiber wt. %) | Izod-Impact strength (KJ × $10^{-5}$) (un-notched) | | | |
|---|---|---|---|---|
| | 10 | 20 | 30 | 40 |
| HDPE 2907 + treated fiber2 | 31.5 | 28.6 | 26.9 | 23.6 |
| HDPE 2907 + treated fiber3 | 31.2 | 29.6 | 26.1 | 24.4 |
| HDPE 2907 + treated fiber4 | 29.1 | 28.0 | 23.7 | 22.8 |

Although the foregoing invention has been described in some detail by way of examples, it is not limited thereto. Changes and modifications of the examples of the invention herein chosen for purpose of disclosures can be made which do not constitute departures from the spirit and scope of the invention.

We claim:

1. A composite consisting essentially of 10–40 percent by weight of pre-treated discontinuous cellulose fibers and 90–60 percent by weight of high density polyethylene prepared by a two step process, wherein the cellulose fibers are pre-treated with ethylene polymer, anhydride and a free radical initiator in a first step, and wherein the second step comprises compounding said pre-treated discontinuous cellulose fibers with said high density polyethylene.

2. The composite of claim 1, wherein the unsaturated anhydride is maleic anhydride.

3. The composite of claim 1, wherein the anhydride is a phthalic anhydride.

4. The composite of claim 1, wherein the free radical initiator is a dicumyl peroxide and amounts to 0.1 to 1.0% by weight of said fibers.

5. The composite of claim 1, wherein the fibers are pre-treated under conditions to reduce fiber-to-fiber interaction.

6. The composite of claim 1, wherein said fibers, ethylene polymer, anhydride and a free radical initiator are mechanically mixed together under conditions of high shear to give said pre-treated discontinuous cellulose fibers.

7. The composite of claim 6, wherein the fibers have an average aspect ratio of from 2 to 200.

8. The pre-treated fiber of claim 6, wherein the fibers are chemithermomechanical wood pulp of hardwood and soft wood, wood flour derived from hardwood and soft wood.

9. The composites of claim 1, having improved flow and mechanical properties and made by compression-/injection molding.

* * * * *